United States Patent [19]

Izawa et al.

[11] 4,158,028

[45] Jun. 12, 1979

[54] POLYPHENYLENE ETHER-STYRENE GRAFT COPOLYMER COMPOSITION AND PREPARATION THEREOF

[75] Inventors: Shinichi Izawa, Tokyo; Jurou Ohzeki, Yokohama; Tsuyoshi Yahata, Kawasaki; Atsuo Nakanishi, Kanagawa, all of Japan

[73] Assignee: Asahi-Dow Limited, Tokyo, Japan

[21] Appl. No.: 935,493

[22] Filed: Aug. 18, 1978

Related U.S. Application Data

[62] Division of Ser. No. 766,514, Feb. 7, 1977, Pat. No. 4,132,684.

[30] Foreign Application Priority Data

Feb. 10, 1976 [JP] Japan .................................. 51-12846
Dec. 27, 1976 [JP] Japan ................................. 51-156567

[51] Int. Cl.$^2$ ...................... C08L 51/00; C08L 53/00
[52] U.S. Cl. ........................... 260/876 B; 260/4 AR; 260/874; 260/876 R; 260/878 R
[58] Field of Search ............... 260/876 R, 876 B, 874, 260/44 R, 878 R

[56] References Cited

U.S. PATENT DOCUMENTS

| 3,700,750 | 10/1972 | Yamanouchi et al. | 260/874 |
| 3,929,930 | 12/1975 | Izawa et al. | 260/874 |
| 3,983,090 | 9/1976 | Abolins et al. | 260/42.18 |

FOREIGN PATENT DOCUMENTS

2126434 12/1971 Fed. Rep. of Germany .......... 260/874

*Primary Examiner*—Richard B. Turer
*Attorney, Agent, or Firm*—Cushman, Darby & Cushman

[57] ABSTRACT

A thermoplastic resin composition containing (I) a graft copolymer of a polyphenylene ether with a styrene type compound, containing substantially no homopolymer of polyphenylene ether, and (II) a graft copolymer of an ethylene copolymer of ethylene and not more than 40 mol percent of at least one unsaturated compound of the formula $CH_2=CH-OCOR_1$ or $CH_2=CR_2-COOR_3$ (wherein $R_1$ denotes an alkyl group having one to four carbon atoms and $R_2$ and $R_3$ each denote a hydrogen atom or an alkyl group having one to four carbon atoms) with a styrene type compound has improved properties such as Izod impact strength, oil resistance and weathering resistance.

33 Claims, No Drawings

POLYPHENYLENE ETHER-STYRENE GRAFT COPOLYMER COMPOSITION AND PREPARATION THEREOF

This is a division of application Ser. No. 766,514 filed Feb. 7, 1977, now U.S. Pat. No. 4,132,684.

This invention relates to a novel graft copolymer composition containing a polyphenylene ether having notably improved oil resistance and to a method for the manufacture of said composition.

Polyphenylene ethers are engineering plastics which are creating attention because of their excellent thermal resistance, chemical resistance and dimensional stability as well as outstanding mechanical, electrical and other properties. Nevertheless, they have the disadvantage that because of high softening points, they have poor fabricating properties and rather inferior impact resistance. As a measure for reducing the softening point and improving the fabricating properties, there has been suggested a composition comprising a polyphenylene ether and a styrene type polymer (see Japanese Patent Publication No. 17812/1968 and Cizek U.S. Pat. No. 3,383,435, for example). For the improvement of the impact resistance, there have been suggested compositions of polyphenylene ether with polystyrenes incorporating rubber polymers such as polybutadienes, styrene-butadiene copolymers or ethylene-α-olefin-polyene terpolymers (see Japanese Patent Publications No. 32730/1972 and No. 26381/1973). It is also known to add a styrene-grafted ethylene copolymer to a mixture of polyphenylene ether and polystyrene (see Japanese Patent Publication No. 32660/1974).

Polyphenylene ethers are resins inherently having excellent thermal resistance and chemical resistance. They are deprived of these characteristic properties when they are combined with styrene type polymers added for the purpose of imparting practical fabricating properties. When they are mixed with polybutadienes or styrene-butadiene copolymers, their thermal resistance, weathering resistance, chemical resistance, etc., deteriorate. Particularly, these compositions become more susceptible to cracks developing under stress in gasoline or machine oils and, therefore, find limited utility in applications involving direct exposure to such liquids. Polyphenylene ethers are incompatible with ethylene-α-olefin-polyene terpolymers and therefore, with any conventional technique, peel-off occurs between these polymers so readily at the time of extrusion molding, injection molding or other similar types of molding, making it difficult to obtain efficiently the desired improvement in impact strength.

The inventors devoted much effort with the view of developing a molding material which retains the merits of polyphenylene ethers such as outstanding thermal stability, weathering resistance and chemical resistance and at the same time enjoys excellent impact resistance and practical fabricating properties. They have consequently arrived at the present invention.

This invention provides a thermoplastic resin composition comprising (I) a graft copolymer having a styrene type compound polymer grafted onto a polyphenylene ether and containing substantially no homopolymer of polyphenylene ether and (II) a graft copolymer having a styrene type compound polymer grafted onto a copolymer of ethylene and 1.0 to 40 mol percent of at least one unsaturated compound represented by the general formula $CH_2=CH-OCOR_1$ or $CH_2=CR_2-COOR_3$ (wherein, $R_1$ denotes an alkyl group having one to four carbon atoms and $R_2$ and $R_3$ each denote a hydrogen atom or an alkyl group having one to four carbon atoms).

It has also been found that the above composition can be further improved in mechanical strength such as impact strength if the above composition is reinforced with a high impact styrene type polymer. Accordingly, the present invention also provides a thermoplastic composition comprising the graft copolymers (I) and (II) as mentioned above and (III) a high impact styrene type polymer.

The present invention further provides a one step process for production of the thermoplastic resin composition as mentioned above, which process comprises polymerizing a styrene type compound under continued agitation using a radical polymerization initiator in the presence of a polyphenylene ether and an ethylene copolymer as set forth above with the optional copresence of a rubbery substance and/or a styrene type compound polymer. The method provided by the present invention permits the obtaining of the desired composition in one step. It is, therefore, the simplest possible process and is extremely advantageous in terms of economy. The composition of the present invention which is obtained by the method of the present invention exhibits unusually high miscibility and provides still better impact resistance, appearance, chemical resistance and oil resistance than the conventional graft copolymer compositions known to the art. The reason for this is not yet known.

The term "polyphenylene ether" as used in the present invention means a polymer which is represented by the general formula:

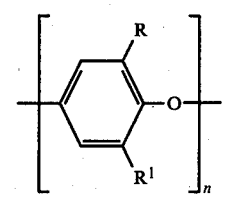

(wherein, R and $R^1$ each denote a hydrogen atom or an alkyl group having one to four carbon atoms and n the degree of polymerization). Concrete examples of such polymers include poly(2,6-dimethylphenylene-1,4-ether), poly(2-methyl-6-ethylphenylene-1,4-ether), poly(2,6-diethylphenylene-1,4-ether), poly(2-methyl-6-n-propylphenylene-1,4-ether), poly(2-methyl-6-n-butyl-phenylene-1,4-ether), poly(2-methylphenylene-1,4-ether), poly(2-n-propylphenylene-1,4-ether), poly(2-ethyl-6-isopropylphenylene-1,4-ether), poly(2,6-di-n-propylphenylene-1,4-ether).

The proportion of the polyphenylene ether component to the entire resin composition is selected in the range of from 20 to 85 percent, preferably from 25 of 75 percent, by weight. If the amount is less than the lower limit 20 percent by weight, then it will prove insufficient for enabling the excellent properties of the polyphenylene ether to be reflected in the composition produced. If it is greater than the upper limit 85 percent by weight, then insufficient improvement will be imparted to the fabricating properties which are lacking in the polyphenylene ether.

The term "ethylene copolymer" as used in the present invention means a copolymer of ethylene with at least one unsaturated compound represented by the general formula of $CH_2=CHOCOR_1$ or $CH_2=CR_2COOR_3$. Concrete examples of the unsaturated compounds include vinyl acetate, acrylic acid, methacrylic acid, methyl methacrylate, ethyl methacrylate, methyl acrylate, ethyl acrylate, butyl acrylate, butyl methacrylate, isopropyl acrylate, t-butyl acrylate, methyl (α-butyl)acrylate, vinyl propionate, vinyl butyrate, vinyl valerate, and propyl(α-butyl)acrylate. One of these unsaturated compounds or a mixture of two or more of said compounds is copolymerized with ethylene in an amount corresponding to a content of not more than 40 mol percent, giving rise to the ethylene copolymer for use herein. If there is used an ethylene copolymer containing more than 40 mol percent of said unsaturated monomer, then there will ensure undesirable effects such as, for example, impairment of the balance of properties of the finally produced composition and notable degradation of the appearance of the article obtained by molding the final composition. The preferred ethylene copolymers are ethylene-methyl methacrylate and ethylene-vinyl acetate.

The proportion of the ethylene copolymer component to the entire resin composition is selected in the range of from 3 to 40 percent, preferably from 5 to 30 percent, by weight. If the amount is less than the lower limit 3 percent by weight, then the composition produced will have reduced chemical resistance and impact resistance. If, on the other hand, it is greater than the upper limit of 40 percent by weight, then the composition produced will exhibit lowered rigidity and thermal resistance.

The styrene type compounds contemplated for use in the present invention include styrene, alkylated or halogenated derivatives of styrene. Concrete examples of the styrene derivatives include α-methyl styrene, 2,4-dimethyl styrene, monochlorostyrene, dichlorostyrene, p-methyl styrene, p-tert.-butyl styrene and ethyl styrene.

These styrene type compounds can be used alone or in combination with one another as a mixture of two or more members or with copolymerizable compounds. Examples of the copolymerizable compounds which are usable herein with the styrene type compound include methyl methacrylate, acrylonitrile, methacrylonitrile, butyl acrylate and butadiene. Normally, styrene alone or a mixture of styrene with acrylonitrile desirably is used as the styrene derivative. When a portion of the styrene type compound is replaced by a copolymerizable compound, the copolymerizable compound is 0 to 30 mol percent of the total of the styrene type compound and copolymerizable compound.

The term "rubbery substance" as used in the present invention refers to natural rubbers, synthetic rubbers derived from conjugate dienes and other synthetic substances which exhibit a rubbery behavior. Concrete examples of such rubbery substances include natural crepe rubber, butadiene-styrene random copolymers, butadiene-styrene block copolymers, butadiene-acrylonitrile copolymers, polybutadienes, polyisoprenes, ethylene-propylene-nonconjugated diene copolymer rubbers, polyester type elastomeric polymers and thermoplastic polyurethane elastomers.

The term "high impact styrene type copolymer" used herein refers to rubber-reinforced polystyrenes, i.e., polymers of the styrene type compound as mentioned above modified with a rubbery substance as mentioned above and acrylonitrile-butadiene-styrene copolymers.

Said copolymer may be available as preformed copolymer or alternatively be formed in situ during preparation of the composition.

The effect of the high impact styrene type copolymer is noticeable when it is present in amount of 10 to 60 weight % based on the total composition.

In the graft polymer (I) of the composition of the present invention, the proportion of the styrene type compound grafted onto the polyphenylene ether is desirably in the range of from 10 to 100 parts, preferably from 15 to 80 parts, by weight based on 100 parts by weight of the polyphenylene ether. If the amount falls short of the lower limit 10 parts by weight, then there will ensue practical inconvenience such as insufficient mixing between the two graft copolymers and consequently resin peeling at the time of molding. If the amount is greater than the upper limit of 100 parts by weight, however, there will result the disadvantage that the inherent properties of polyphenylene ether are lost.

In the graft polymer (II) of the composition of this invention, the proportion of the styrene type compound to be graft copolymerized onto the ethylene copolymer is desirably in the range of from 10 to 150 parts, more preferably from 15 to 130 parts, per part by weight based on 100 parts by weight of the backbone polymer. If the amount is less than the lower limit of 10 parts by weight, then there will be the disadvantage of insufficient miscibility between the graft copolymers. If it is greater than the upper limit of 150 parts by weight, then there will ensue undesirable effects such as loss of the inherent properties of the backbone polymer and impairment of the balance of properties of the finally produced composition.

The composition of the present invention may further contain a styrene type compound polymer, including homopolymers and copolymers of the styrene type monomers selected from styrene and styrene derivatives such as α-methyl styrene, chlorostyrene, dichlorostyrene, dimethyl styrene, t-butyl styrene, vinyl toluene and ethylvinyl benzene; styrene-acrylonitrile copolymers; and various copolymers of the styrene type monomers as mentioned above with a minor amount of copolymerizable compounds such as vinyl chloride, methyl methacrylate, butyl acrylate, vinyl acetate, glycidyl methacrylate or vinyl ether.

One of the process provided by this invention comprises polymerizing under continued agitation a styrene type compound in the presence of 20 to 85 percent by weight based on the final composition of a polyphenylene ether of the above formula, 3 to 40 percent by weight of an ethylene copolymer as mentioned above and a radical polymerization initiator, at a temperature in the range of from 120° to 290° C. According to a preferred embodiment of this process, 10 to 200 parts, preferably 15 to 180 parts, by weight of a styrene type compound are polymerized per 100 parts by weight of a polyphenylene ether and 4 to 200 parts by weight of an ethylene copolymer. Use of less than 10 parts by weight of the styrene type compound is undesirable, because the final composition fails to acquire sufficient miscibility because of the survival of free polyphenylene ether, insufficiency of the amount of the styrene type compound polymer grafted onto the ethylene copolymer, and the like.

As one preferable modification of the above process, 1 to 10 percent by weight of a rubbery substance is further added. This mode of the process, according to a preferred embodiment, comprises polymerizing 10 to 200 parts, preferably 15 to 180 parts, by weight of a styrene type compound per 100 parts by weight of a polyphenylene ether, 4 to 120 parts by weight of an ethylene copolymer, 2 to 30 parts by weight of a rubbery substance and 0 to 50 parts by weight of a styrene type compound polymer. Use of less than 10 parts by weight of the styrene type compound is also undesirable in this embodiment, for the same reasons as mentioned above.

It is evident that the radical polymerization initiator used in the present invention will, in the course of the polymerization of the styrene type compound, accelerate the grafting reaction onto the polyphenylene ether chain. The polymerization performed in the absence of said initiator produces a composition in which a large proportion of the polyphenylene ether remains in the form of homopolymer and exerts adverse effects on the various properties of the composition. Concrete examples of compounds which are useable as the radical polymerization initiator herein are di-tert.-butyl peroxide, benzoyl peroxide, lauroyl peroxide, dicumyl peroxide, potassium persulfate, ammonium persulfate and sodium perborate. Depending on conditions such as the polymerization temperature or other similar factors, these radical polymerization initiators may be used in combination with one another in the form of mixtures of two or more members. The amount of the radical polymerization initiator is selected in the range of from 0.3 to 15 parts, preferably from 0.5 to 12 parts, by weight based on 100 parts by weight of the polyphenylene ether. If the amount of the initiator added falls short of the lower limit 0.3 parts by weight, then the grafting reaction does not proceed sufficiently, having adverse effects on the properties of the final composition. If the amount of the added initiator is greater than the upper limit 15 parts by weight, then there ensue undesirable effects such as excessive decrease in the chain length of the styrene type compound polymer grafted, extreme reduction in the molecular weight of the homopolymer of the styrene type compound by-produced in the course of the graft polymerization and degradation of the properties of the final composition.

The polymerization temperature for the styrene type compound subjected to the graft polymerization is selected in the range of from 120° to 290° C., desirably from 135° to 260° C., and more preferably from 180° to 250° C. If the styrene type compound is polymerized at a temperature falling below the lower limit 120° C., then the polyphenylene ether and the ethylene copolymer will remain in the form of their respective homopolymers in the final composition. If, on the other hand, there is used a temperature higher than the upper limit 290° C., then both thermal polymerization and radical chain transfer of the styrene type compound will proceed at unusually high rates and the chain length of the styrene type compound polymer will be decreased excessively.

In the method of manufacture by the present invention, a solvent capable of dissolving the polyphenylene ether (e.g. aromatic hydrocarbons, typically xylene, ethyl benzene, etc.) and the ethylene copolymer at the polymerization temperature can be present in the reaction system. Furthermore, a plasticizer or other similar additive can be present in the reaction system during the polymerization of the styrene type compound. The present invention is not limited by the type of reactor used. The manufacture of the composition can be carried out by use of a pressure reaction kettle, an extruder, rolls, a Banbury mixer, etc.

When the process of the present invention is practiced by using an extruder, a mixture of a styrene type compound, polyphenylene ether, an ethylene copolymer and a radical initiator is fed with optional co-presence of a rubbery substance and/or a styrene type compound polymer into an extruder capable of continuous feeding and extrusion thereby to effect graft copolymerization in the extruder. The types of the screw of the extruder may either be monoaxial, or biaxial which may either rotate in the same or opposite directions. Favorable results may sometimes be obtained by use of an extruder equipped with a darumage or a kneading zone excelled in kneading ability. The diameter of the screw to be employed falls in the range from 10 to 200 m/m, preferably from 20 to 150 m/m, more preferably from 30 to 120 m/m. With an extruder having a diameter of less than 10 m/m, it is difficult to attain reproducibility. On the other hand, with an extruder having a diameter of more than 200 m/m, control of polymerization heat is difficult. The number of revolution of the screw is determined by the extent of kneading required for graft copolymerization and the amount of extrudate and falls generally in the range from 5 to 500 r.p.m., preferably from 10 to 400 r.p.m., more preferably from 15 to 300 r.p.m. With a revolution of less than 5 r.p.m., kneading is insufficient resulting in poor graft polymerization. On the other hand, with a revolution of more than 500 r.p.m., residence time is too short to obtain favorable results. The extruder is maintained at a temperature of 120° to 290° C., preferably from 135° to 260° C., more preferably from 180° to 250° C. The average residence time in the extruder during which graft polymerization is effected is from 0.5 to 20 minutes, preferably from 0.7 to 15 minutes, more preferably from 1 to 10 minutes. If the residence time is shorter than 0.5 minute, homopolymers of polyphenylene ether remain under conditions whereby all radical initiators are consumed. On the other hand, if it is longer than 20 minutes, troubles such as deterioration or discoloration of the polymer may occur. In obtaining the graft copolymer of the invention, a mixture comprising wellmixed blends of the four components of polyphenylene ether, styrene type compound, radical initiator and ethylene copolymer may be used. Alternatively, a mixture of five or six components further containing rubbery substance and/or styrene type compound polymer in addition to the above components may also be used to obtain in one step the product composition of the invention. Further, a mixture of the four components of polyphenylene ether, styrene type compound, radical initiator and styrene type compound polymer may previously mixed well before said mixture is fed to the extruder to carry out graft copolymerization, followed by blending with separately prepared ethylene type copolymer having styrene type compound graft polymerized thereon.

The resin composition of the present invention can also be obtained by causing a graft copolymer of a polyphenylene ether with a styrene type compound produced by the method suggested by the inventors and disclosed in Japanese Patent Application Laid Open No. 51197/1975 and Izawa U.S. Pat. No. 3,929,930 and a graft copolymer obtained by graft polymerizing a styrene type compound onto an ethylene copolymer to be melted and kneaded in an extruder or a roll mixer or Banbury mixer or solution-blended for example. The entire disclosure of the Izawa U.S. Pat. No. 3,929,930 is hereby incorporated by reference and relied upon.

The thermoplastic resin composition of the present invention is not limited by the methods whereby the component graft copolymers thereof are respectively prepared or by the method whereby said component graft copolymers are kneaded.

The composition of the present invention which is obtained as described above has a nature such that it far excels the polyphenylene ether-containing compositions heretofore known to the art in chemical resistance and oil resistance and, furthermore, exhibits a higher softening point and better melt-flow properties. The composition shows weathering resistance and thermal stability equal to or better than those of the conventional countertype using an ethylene-α-olefin copolymer as the rubber substance and enjoys much higher impact resistance than said countertype.

The present invention will be described in further detail by reference to preferred embodiments, which are set forth for the purpose of providing more specific illustration and are not limitative of the invention in any way. Wherever there are mentioned parts and percents, they mean parts by weight and percents by weight, respectively, unless otherwise indicated. Unless otherwise stated specifically, the kneading for the production of the desired composition was carried out by passing a mixture of the components through a variable-pitch monoaxial extruder. At the time of kneading, the extrusion temperature was maintained in the approximate range of from 240° to 300° C. The composition which had gone through the extruder was cut into pellets, which were molded by a standard method into test pieces. Izod impact strength was measured with test pieces 0.32 cm in thickness in accordance with ASTM D-256-56. The oil resistance was reported in terms of the lowest strain (percent) (hereinafter referred to as "critical strain") wherein test pieces 0.32 cm in thickness were treated to apply flexural strain and then immersed in turbine oil (Turbine Oil NBK made by Nippon Oil Co., Ltd.) for 24 hours to sustain cracks or a fracture following the Bending Form Method of Dow Chemical Co. with necessary modifications. The weathering resistance was reported in terms of the ratio of retention of Izod impact strength which was determined by having test pieces 0.32 cm in thickness exposed to accelerated weather conditions for 200 hours in a Weather-o-meter (Model WE-SUN-HC made by Toyo Rika Manufactory) and testing the test pieces for Izod impact strength and calculating the ratio of the found values of Izod impact strength to the corresponding values obtained before exposure. The melt index, unless specifically stated otherwise, was measured at 250° C. under a load of 10 kg. The softening point was measured in accordance with ASTM D-1525.

The analyses obtained of the resins of the present invention are conduced in the following manner:

An accurately weighed 5 g portion of a given resin composition was shaken with 100 ml of xylene at 140° C. for two hours, then left to cool, filtered and thereafter washed with xylene. To the insolubles which resulted were added 100 ml of xylene and the mixture was subjected to the same procedure. The filtrate and the washings were collected and then precipitated by 500 ml of methanol. By this method of fractionation, a styrene-grafted ethylene copolymer in a state perfectly free from a polyphenylene ether was obtained in the xylene-insoluble fraction and a styrene-grafted polyphenylene ether in a state free from an ethylene copolymer component was obtained in the xylene-soluble fraction. The xylene-soluble fraction could be treated for separation therefrom of a polyphenylene ether by the method of A. Factor [(J. Polymer Sci., 71, 205 (1969)]. Specifically, this was done by dissolving 1 g of the xylene-soluble fraction in 20 ml of methylene chloride, allowing the resultant solution to stand at room temperature for three hours, thereafter separating the formed precipitate by filtration and drying the separated filtrate. The homopolymer of polyphenylene ether was substantially quantitatively recovered (in a yield of not less than 95 percent) in the form of a precipitate. The ratio of polystyrene to ethylene copolymer in the xylene-insoluble fraction and the ratio of polystyrene to polyphenylene ether in the xylene-soluble fraction were quantitatively determined by means of infrared absorption spectrometry.

EXAMPLE 1

There were placed in an autoclave having an inner volume of 3 liters, 600 parts of poly(2,6-dimethylphenylene-1,4-ether) having an intrinsic viscosity (measured in chloroform at 30° C.; which measuring procedure invariably applies hereinafter) of 0.48, 180 parts of an ethylene-methyl methacrylate copolymer (having a methyl methacrylate content of 18 percent and a melt index of 12 g/10 minutes) and 600 parts of ethylbenzene and then dissolution was obtained by agitating with heating at 130° C. Then, 24 parts of di-tert.-butyl peroxide and 420 parts of styrene were added thereto and polymerization under agitation carried out at 170° C. for one hour. The reaction product was dried under vacuum at 180° C. for three hours and subsequently freed from ethylbenzene and the unaltered styrene to produce a resin composition. The properties of the composition thus obtained were found to be 34.5 kg·cm/cm for the Izod impact strength not less than 1.9 percent for the critical strain as the oil resistance, 97 percent for the Izod impact strength retained after 200 hours of exposure as the weathering resistance and 10.8 g/10 minutes as the melt index.

EXAMPLE 2

The procedure of Example 1 was repeated, except that 180 parts of an ethylene-vinyl acetate copolymer (having a vinyl acetate content of 15 percent and a melt index of 24 g/10 minutes measured under a load of 2.16 kg at 190° C.) was used instead of the ethylene-methyl methacrylate copolymer. The resin composition consequently obtained had 31.0 kg·cm/cm for the Izod impact strength, 95 percent for the weathering resistance (retention ratio of Izod impact strength) and an unusually good appearance.

EXAMPLE 3

In a Henshell mixer, 1 kg of the same polyphenylene ether and 300 g of the same ethylene-methyl methacrylate copolymer as used in Example 1, 700 g of p-methyl styrene and 20 g of di-tert.-butyl peroxide were mixed. The resultant mixture was fed to a monoaxial extruder having as the largest diameter 40 mm and extruded thereby under the conditions of 250° C. of maximum temperature and 60 r.p.m. to produce a resin composition. The composition thus produced was found to have 28.5 kg·cm/cm for the Izod impact strength, 93 percent for the weathering resistance (retention ratio of Izod impact strength) and more than 1.9 percent for the oil resistance (critical strain).

EXAMPLE 4

A resin composition was obtained by repeating the procedure of Example 3, except 1 kg of poly(2,6-dimethylphenylene-1,4-ether) having an intrinsic viscosity of 0.70 was used. The composition thus obtained had 36.0 kg·cm/cm for the Izod impact strength, 96 percent for the weathering resistance (retention ratio of Izod impact strength) and more than 1.9 percent for the oil resistance (critical strain).

EXAMPLE 5

In a Henshell mixer, 100 parts of poly(2,6-dimethylphenylene-1,4-ether) having an intrinsic viscosity of 0.58, 40 parts of an ethylene-methyl methacrylate copolymer (having a methyl methacrylate content of 7.5 percent and a melt index of 10.5 g/10 minutes), 40 parts of styrene and 2 parts of di-tert.-butyl peroxide were thoroughly mixed. Similarly to Example 3, the resultant mixture was passed through an extruder and pelletized to produce a resin composition. A shaped article obtained by injection molding the composition had a good appearance. The properties were 38.5 kg·cm/cm for the Izod impact strength, 95 percent for the weathering resistance (ratio of retention of Izod impact strength) and more than 1.9 percent for the oil resistance (critical strain).

COMPARISON EXAMPLES 1-3

Comparative tests were conducted according to the same procedure as in Example 5 except that the amounts of di-tert.-butyl peroxide were varied. The resulting resinous compositions were analyzed by the method of Factor as described above to determine the content of homopolymer of polyphenylene ether. The results are shown in Table 1 together with that of Example 5.

Table 1

|  | Di-tert.-butyl peroxide (parts) | Precipitate from methylene chloride | |
|---|---|---|---|
|  |  | % based on total PPE | PS content % |
| Comparison Example 1 | 0 | 80 | 1-2 |
| Comparison Example 2 | 0.1 | 69 | 2-3 |
| Comparison Example 3 | 0.2 | 55 | 2-3 |
| Example 5 | 2.0 | 0 | — |

The above resinous compositions had the properties as shown in Table 2.

Table 2

|  | Appearance | Izod impact strength (Kg · cm/cm) | Weathering resistance (retention ratio, %) | Oil resistance (critical strain) |
|---|---|---|---|---|
| Comparison Example 1 | Bad | 4.2 | 60 | 0.18 |
| Comparison Example 2 | Bad | 4.8 | 53 | 0.21 |
| Comparison Example 3 | Bad | 5.1 | 55 | 0.21 |
| Example 5 | Good | 38.5 | 95 | >1.9 |

EXAMPLE 6

The procedure of Example 5 was repeated, except that a mixture of 12 parts of acrylonitrile with 28 parts of styrene was used instead of styrene. A shaped article obtained by injection molding the resultant resin composition showed a good appearance. The properties thereof were 29.0 kg·cm/cm for the Izod impact strength, 93 percent for the weathering resistance (ratio of retention of Izod impact strength) and more than 1.9 percent for the oil resistance (critical strain).

COMPARISON EXAMPLE 4

In a blender, 100 parts of the same polyphenylene ether and 40 parts of the same ethylene-methyl methacrylate copolymer as used in Example 6 and 40 parts of a styrene-acrylonitrile copolymer containing 30 percent of acrylonitrile were kneaded. The resultant mixture was melted and kneaded by using the same extruder as in Example 6. A shaped article obtained by injection molding the resultant mixed resin was observed to suffer from heavy resin peeling. The properties were 5.7 kg·cm/cm for the Izod impact strength, 58 percent for the weathering resistance (ratio of retention of Izod impact strength) and 0.43 percent for the oil resistance (critical strain).

EXAMPLE 7

The procedure of Example 1 was repeated, except that 180 parts of an ethylene-butyl acrylate copolymer (having a butyl acrylate content of 6 percent and a melt index of 6.5 g/10 minutes) was used instead of the ethylene-methyl methacrylate copolymer. The properties of the resin composition consequently formed were 30.0 kg·cm/cm for the Izod impact strength, more than 1.9 percent for the oil resistance (critical strain), 95 percent for the weathering resistance (ratio of retention of Izod impact strength) and 13.0 g/10 minutes for the melt index.

EXAMPLE 8

The procedure of Example 1 was repeated, except that poly(2,6-dimethylphenylene-1,4-ether) having an intrinsic viscosity of 0.32 was used. The properties of the resultant resin composition were 19.7 kg·cm/cm for the Izod impact strength, 91 percent for the weathering resistance (ratio of retention of Izod impact strength), 1.43 percent for the oil resistance (critical strain) and 21.7 g/10 minutes for the melt index.

EXAMPLE 9

In a Henshell mixer, 50 parts of poly(2,6-dimethylphenylene-1,4-ether) having an intrinsic viscosity of 0.39, 10 parts of polystyrene (Styron 683 produced by Asahi-Dow, Ltd., Japan), 10 parts of styrene and 2 parts of di-tert.-butyl peroxide were mixed. The resultant mixture was passed through an extruder kept at 230° C., and pelletized to give polyphenylene ether graft copolymer having styrene grafted thereto.

Separately, 50 parts of an ethylene-methyl methacrylate copolymer containing 7.5 percent of methyl methacrylate and having a melt index of 12 g/10 minutes was thoroughly mixed with 25 parts of styrene and 1 part of di-tert.-butyl peroxide. The resultant mixture was passed through an extruder kept at 180° C. to produce a styrene-grafted ethylene copolymer.

In a blender, 70 parts of the polyphenylene ether graft copolymer obtained as described above was mixed thoroughly with 30 parts of the styrene-grafted ethylene copolymer. The resultant mixture was melted and kneaded by being passed through an extruder kept at 220° C. to produce a resin composition. The properties of the composition were 28.8 kg·cm/cm for the Izod impact strength, 94 percent for the weathering resistance (ratio of retention of Izod impact strength) and more than 0.9 percent for the oil resistance (critical strain). A shaped article obtained by injection molding this resin composition had a good appearance.

COMPARISON EXAMPLE 5

In a blender, 50 parts of the same polyphenylene ether as used in Example 1 and 50 parts of rubber modified polystyrene (Styron made by Asahi-Dow, Ltd., Japan) were mixed and the resultant mixture was melted and kneaded by means of an extruder. The properties of the resin thus obtained are shown in Table 3.

COMPARISON EXAMPLE 6

With 28 percent of a graft copolymer having 46% of polystyrene side chain grafted onto an ethylene-propylene-5-ethylidene-2-norbornene terpolymer (Dutral 244 made by Montedison), 22 percent of a polystyrene and 50 percent of the same polyphenylene ether as used in Example 1 were mixed. The resultant mixture was melted and kneaded by passage through an extruder, to produce a resin composition. The properties of the resin thus obtained are shown in Table 3. From the results given in the table, it is seen that the resins obtained in these comparison examples had conspicuous drawbacks in weathering resistance, oil resistance, peel-off of resins, etc.

Table 3

|  | Comparison Example 5 | Comparison Example 6 |
|---|---|---|
| Izod impact strength (Kg · cm/cm) | 12.4 | 15.3 |
| Weathering resistance (ratio of retention of Izod impact strength) (%) | 42 | 89 |
| Oil resistance (critical strain) (%) | 0.46 | 0.79 |
| Vicat softening point. (°C.) | 151 | 145 |
| Peel-off of resins in shaped article | No | Yes |

Typical fractionations by Factor's method of the resin compositions obtained in preferred embodiments of this invention are shown in Table 4.

Table 4

| | Xylene-insoluble fraction | | Xylene-soluble fraction | | |
|---|---|---|---|---|---|
| | Percent by weight | Polystyrene/ethylene copolymer (ratio by percentage) | Percent by weight | Polystyrene-polyphenylene ether (ratio by percentage) | Insoluble in methylene chloride |
| Example 1 | 25 | 39/61 | 75 | 34/66 | no |
| Example 2 | 22 | 32/68 | 78 | 26/74 | no |
| Example 3 | 35 | 57/43 | 65 | 23/77 | no |
| Example 4 | 30 | 50/50 | 70 | 29/71 | no |
| Example 5 | 31 | 27/73 | 69 | 20/80 | no |

EXAMPLE 10

In an autoclave having an inner volume of 3 liters, 15 parts of polybutadiene, 600 parts of poly(2,6-dimethylphenylene-1,4-ether) having an intrinsic viscosity of 0.48, 180 parts of ethylene methacrylate copolymer (methyl methacrylate content 18 mol percent, melt index 12 g/10 minutes), 60 parts of polystyrene and 600 parts of ethylbenzene were dissolved by agitation at an elevated temperature of 130° C. Then, 24 parts of di-tert.-butyl peroxide and 420 parts of styrene were added to the solution and the solution agitated at 170° C. for one hour to effect a polymerization. The reaction product was dried under vacuum at 180° C. for three hours and treated to be freed from ethyl benzene and the unaltered styrene. Thus, there was obtained a resin composition. The resin composition could be injection molded under the conditions of 240° C. and 550 kg/cm$^2$. The molded article was found to have a tensile strength (measured according to ASTM D-638; similarly applicable hereinafter) of 490 kg/cm$^2$, an Izod impact strength (measured according to ASTM D-256, similarly applicable hereinafter) of 44.5 kg·cm/cm and a heat distortion temperature under load (measured according to ASTM D-648; similarly applicable hereinafter) of 124° C. In appearance, it had a smooth surface.

COMPARISON EXAMPLES 6-8

Comparative tests were conducted according to the same procedure as in Example 10 except that the amounts of di-tert.-butyl peroxide were varied. The resulting resinous compositions were measured to have the physical properties as shown in Table 5. Chemical resistances in turbine oil, isopropanol and n-heptane of these compositions and that of Example 10 were also measured to give the results (critical strain) as shown in Table 6.

Table 5

| | Di-tert.-butyl peroxide (parts) | Tensile strength (Kg/cm$^2$) | Izod impact strength (Kg · cm/cm) | Heat distortion temperature (°C.) | Appearance |
|---|---|---|---|---|---|
| Comparison Example 6 | 0 | 400 | 7.2 | 108 | Bad |
| Comparison Example 7 | 0.5 | 390 | 6.8 | 106 | Bad |
| Comparison Example 8 | 1 | 390 | 9.0 | 110 | Bad |
| Example 10 | 24 | 490 | 44.5 | 124 | Good |

Table 6

| | Chemicals | | |
|---|---|---|---|
| | Turbine oil | Isopropanol | n-Heptane |
| Comparison Example 6 | 0.22 % | 0.48 % | 0.29 % |
| Comparison Example 7 | 0.26 % | 0.51 % | 0.31 % |
| Comparison Example 8 | 0.30 % | 0.50 % | 0.32 % |
| Example 10 | 1.50 % | 1.61 % | 1.09 % |

EXAMPLE 11

The procedure of Example 10 was repeated, except 180 parts of ethylene-vinyl acetate copolymer (vinyl acetate content 15 mol percent and melt index 24 g/10 minutes as measured at 190° C. under a load of 2.16 kg) was used instead of the ethylene-methyl methacrylate copolymer. The resin composition which was consequently obtained could be injection molded under the same conditions as those of Example 10. The molded article was found to have a tensile strength of 520 kg/cm$^2$, an Izod impact strength of 42.0 kg·cm/cm and a heat distortion temperature under load of 122° C.

EXAMPLE 12

By use of a Henshell mixer, 1 kg of the same polyphenylene ether, 300 g of ethylene-methyl methacrylate copolymer, 100 g of a rubber-reinforced polystyrene containing 5 percent of polybutadiene rubber, 100 g of polystyrene reinforced with a styrene-butadiene block copolymer rubber, 50 g of a styrene-butadiene block copolymer rubber ("Tufprene" produced by Asahi Kasei Kogyo Kabushiki Kaisha, Japan), 500 g of styrene and 20 g of di-tert.-butyl peroxide were mixed. The resultant mixture was fed to a monoaxial extruder having as the largest diameter 40 mm and extruded under the conditions of 250° C. (highest temperature) and 60 r.p.m. rotation rate to produce a resin composition. The resin composition could be injection molded under the conditions of 250° C. and 600 kg/cm$^2$. The molded article was found to have a tensile strength of 590 kg/cm$^2$, an Izod impact strength of 45.0 kg·cm/cm and a heat distortion temperature under load of 132° C.

EXAMPLE 13

The procedure of Example 12 was repeated, except that 1 kg of poly(2,6-dimethylphenylene-1,4-ether) having an intrinsic viscosity of 0.70 was used to produce a resin composition. The resin composition could be injection molded under the conditions of 260° C. and 650 kg/cm$^2$. The molded article was found to have a tensile strength of 610 kg/cm$^2$, an Izod impact strength of 41.5 kg·cm/cm and a heat distortion temperature under load of 131° C.

EXAMPLE 14

In a Henshell mixer, 100 g of poly(2,6-dimethylphenylene-1,4-ether) having an intrinsic viscosity of 0.58, 30 parts of an ethylene-methyl methacrylate copolymer (methyl methacrylate content 7.5 mol percent, melt index 10.5 g/10 minutes), 30 parts of styrene, 10 parts of butadiene-styrene block copolymer rubber and 2 parts of di-tert.-butyl peroxide were thoroughly mixed. The resultant mixture was passed through an extruder similarly as in Example 12 and pelletized to produce a resin composition.

The resin composition obtained was found to have a tensile strength of 560 kg/cm$^2$, an Izod impact strength of 460 kg·cm/cm and a heat distortion temperature under load of 128° C.

COMPARISON EXAMPLES 9–11

Comparative tests were conducted according to the same procedure as in Example 14 except that the amounts of di-tert.-butyl peroxide was varied. The physical properties and chemical resistance in turbine oil, isopropanol and n-heptane were measured to give the results as shown in Table 7 and Table 8.

Table 7

| | Di-tert.-butyl peroxide (parts) | Tensile strength (Kg/cm$^2$) | Izod impact strength (Kg · cm/cm) | Heat distortion temperature (°C.) |
|---|---|---|---|---|
| Comparison Example 9 | 0 | 480 | 8.5 | 106 |
| Comparison Example 10 | 0.1 | 440 | 8.3 | 109 |
| Comparison Example 11 | 0.2 | 410 | 9.5 | 112 |
| Example 14 | 2.0 | 560 | 46.0 | 128 |

Table 8

| | Chemicals (critical strain, %) | | |
|---|---|---|---|
| | Turbine oil | Isopropanol | n-Heptane |
| Comparison Example 9 | 0.25 | 0.58 | 0.30 |
| Comparison Example 10 | 0.33 | 0.66 | 0.29 |
| Example 14 | 1.59 | 1.70 | 1.15 |

EXAMPLE 15

The procedure of Example 14 was repeated, except a mixture of 12 parts of acrylonitrile and 28 parts of styrene was used instead of styrene. The injection molded article of the resultant resin composition had a good appearance and was found to have a tensile strength of 580 kg/cm$^2$, an Izod impact strength of 40.0 kg·cm/cm and a heat distortion temperature under load of 132° C.

EXAMPLE 16

The procedure of Example 10 was repeated, except that poly(2,6-dimethylphenylene-1,4-ether) having an intrinsic viscosity of 0.36 was used. The resin composition which was consequently obtained was found to have a tensile strength of 500 kg/cm$^2$, an Izod impact strength of 25.8 kg·cm/cm and a heat distortion temperature under load of 122° C.

EXAMPLE 17

In a blender, 1 kg of the same polyphenylene ether as used in Example 16, 250 g of the same ethylene-methyl methacrylate compolymer as used in Example 10, 150 g of an emulsion-polymerized styrene-grafted polybutadiene containing 50 percent of polybutadiene, 400 g of styrene and 20 g of di-tert.-butyl peroxide were thoroughly mixed. The resultant mixture was passed through an extruder by following the procedure of Example 12 with necessary modifications, to obtain a resin composition. In an extruder, 1.2 kg of the resultant resin composition and 300 g of a rubber-reinforced polystyrene ("Styron" 492, produced by Asahi-Dow Limited, Japan) were melted and kneaded. The mixture was injection molded. The test piece made from the injection molded product was found to have a tensile strength of 475 kg/cm², an Izod impact strength of 47.5 kg·cm/cm and a heat distortion temperature under load of 116° C.

The test data obtained for embodiments according to Examples 10 to 17 concerning the chemical resistance and the weathering resistance are shown below.

Table 9

| | Chemical Resistance (in critical strain, %) | | |
|---|---|---|---|
| | Chemical | | |
| Example No. | Turbine oil (Type NBK made by Nippon Oil) | Isopropanol | n-Heptane |
| 10 | 1.50 | 1.61 | 1.09 |
| 11 | 1.43 | 1.55 | 1.01 |
| 12 | 1.55 | 1.69 | 1.09 |
| 13 | 1.60 | 1.70 | 1.20 |
| 14 | 1.59 | 1.70 | 1.15 |
| 15 | >1.90 | 1.20 | 1.40 |
| 16 | 1.33 | 1.40 | 0.62 |
| 17 | 1.30 | 1.35 | 0.60 |

Table 10:

| | Weathering Resistance |
|---|---|
| Example No. | Ratio of retained strength (%) |
| 10 | 95 |
| 11 | 95 |
| 12 | 91 |
| 13 | 91 |
| 14 | 89 |
| 15 | 88 |
| 16 | 95 |
| 17 | 93 |

EXAMPLE 18

In a blender there were well mixed 600 parts of poly(2,6-dimethylphenylene-1,4-ether), 180 parts of ethylene-methyl methacrylate copolymer (methyl methacrylate content 9 mol %, melt index = 11 g/10 minutes), 60 parts of polystyrene (Styrene 492: product of Asahi-Dow Limited, Japan), 180 parts of styrene and 20 parts of di-tert.-butyl peroxide. The blended mixture was fed to a biaxial extruder with outer screw diameter of 40 m/m and fusion blended therein at a maximum temperature of 240° C. 80 parts of the resulting resin mixture were blended with 20 parts of rubber reinforced polystyrene (Styron QH 405: product of Asahi-Dow Limited, Japan) and the blend obtained was kneaded once through a monoaxial extruder to obtain a resinous composition. The resinous composition had an Izod impact strength of 34.0 kg·cm/cm, oil resistance of more than 1.9% (critical strain) and weathering resistance (retention ratio) of 88%.

EXAMPLE 19

The graft polymerization method by means of biaxial extruder of Example 18 was repeated by using 30 parts of acrylonitrile and 150 parts of styrene in place of styrene alone. Seventy parts of the resulting resin were blended well with 30 parts of styrene-acrylonitrile-butadiene copolymer resin (Stylac 301: product of Asahi-Dow Limited, Japan) in a blender and the blend obtained was melted and kneaded by passing once through a monoaxial extruder to obtain the resinous composition. The thus obtained composition had an Izod impact strength of 33.0 kg·cm/cm, oil resistance of more than 1.9% (critical strain) and weathering resistance of 87% (retention ratio).

EXAMPLE 20

Example 10 was repeated without use of 15 parts of polybutadiene. The resulting resinous composition exhibited characteristic values of 34.5 kg·cm/cm for the Izod impact strength, more than 1.9% (critical strain) for the oil resistance and 97% for the weathering resistance (retention ratio) and had a melt index of 10.8 g/10 minutes.

Sixty-five parts of the above resinous composition were blended well in a blender with 35 parts of rubber reinforced polystyrene (Styron QH 405: product of Asahi-Dow Limited, Japan) and the blend was fusion blended by passing once through a monoaxial extruder to give a resinous composition. The resinous composition showed an Izod impact strength of 37.5 kg·cm/cm, oil resistance of 1.8% (critical strain) and weathering resistance of 86% (retention ratio).

COMPARISON EXAMPLE 12

A homogeneous dissolution was prepared by mixing 110 parts of styrene monomer, 15 parts of styrene-grafted ethylene-vinyl acetate copolymer (vinyl acetate content in backbone polymer: 8%; amount of styrene grafted in the polymer: 15%), 23 parts of ethyl benzene and 2 parts of mineral oil. This solution was fed continuously into the first reactor under agitation of 30 r.p.m. to undergo bulk polymerization. Polymerization proceeded by adjusting the temperature and the time so that the total solid at the exit of the first reactor may be 30%. The mixture from the first reactor is mixed well with a homogeneous mixture of 50 parts of ethyl benzene, 50 parts of styrene monomer and 50 parts of poly(2,6-dimethylphenylene-1,4-ether) and then fed to the second reactor to further undergo polymerization. The feeding rate of the mixture added during the polymerization was controlled to 1/1 in terms of the ratio relative to that of the mixture fed into the first reactor. Polymerization was completed substantially in the second reactor. After removal of volatiles, the mixed resin was recovered. The xylene-soluble fractions of the resulting mixed resin were dissolved in methylene chloride and left to stand for three hours at room temperature. As the result, there were formed precipitates in amounts of 85% based on the total polyphenylene ether. Said precipitates contained substantially no polystyrene, but consisted only of homopolymers of polyphenylene ether. The injection molded product of this mixed resin had a slightly bad appearance and Izod impact strength of 12.8 kg·cm/cm, weathering resistance (retention ratio) of 59% and oil resistance (critical strain) of 0.33%.

COMPARISON EXAMPLE 13

A homogeneous mixture of 1.2 kg of styrene monomer, 100 g of ethyl benzene, 30 g of mineral oil and styrene-grafted ethylene-ethyl methacrylate copolymer (ethyl methacrylate content in the backbone polymer: 5%; amount of styrene grafted in the polymer: 25%) was heated under agitation to an elevated temperature to undergo thermal polymerization. The temperature was elevated up to 140° C. within 3 hours and then cooled to 70° C. for addition of 1.8 kg of poly(2,6-dimethylphenylene-1,4-ether), followed by heating up to 140° C. again. The temperature was thereafter elevated up to 175° C. within 5 hours thereby to complete substantially the polymerization. After removal of volatiles under reduced pressure, a mixed resin was obtained. The xylene-soluble fractions of the resulting resin were dissolved in methylene chloride and left at room temperature for three hours, whereby precipitates were formed in amounts of 88% based on the total polyphenylene ether. Analysis of the precipitates by infra-red spectrum gave the result that there was substantially no polystyrene but only homopolymers of polyphenylene ether. The injection molded product of this mixed resin had slightly bad appearance, Izod impact strength of 18.6 kg·cm/cm, weathering resistance (retention ratio) of 67% and oil resistance (critical strain) of 0.29%.

As apparently seen from the results in Comparison Examples 12 and 13, it is critically required that homopolymers of polyphenylene ether should substantially be absent in the present composition.

EXAMPLE 21

There was mixed in a Henshell mixer 10 kg of poly (2,6-dimethylphenylene-1,4-ether), 800 g of ethylene-methyl methacrylate copolymer (containing 5 weight % of methyl methacrylate), 2.2 kg of polystyrene (Styreon 683: trade name, produced by Asahi-Dow Limited, Japan) and 200 g of di-tert.-butyl peroxide. The mixture was fed to a biaxial extruder (rotating in the same direction) with screw diameter of 53 mm and extruded under conditions of the maximum temperature of 240° C. and 100 r.p.m. to obtain a graft copolymer. A well-mixed blend of 75 parts of this copolymer and 25 parts of rubber-reinforced polystyrene (Styron QH 405: trade name, produced by Asahi-Dow Limited, Japan) was melted and kneaded through an extruder. The resulting resinous composition had Izod impact strength of 39.0 kg·cm/cm, oil resistance (critical strain) of 1.82% and weathering resistance (retention ratio) of 93%.

EXAMPLE 22

The same feeding material as used in Example 21 except that the amount of polystyrene was increased to 3.2 kg was fed to a biaxial extruder (rotating in opposite directions) and extruded under conditions of maximum temperature of 240° C. and 85 r.p.m. to obtain a copolymer. A well-mixed blend of 85 parts of this copolymer and 15 parts of the same styrene-grafted polybutadiene as used in Example 17 was melted and kneaded through an extruder. The resulting resinous composition had Izod impact strength of 45.2 kg·cm/cm, oil resistance (critical strain) of 1.75% and weathering resistance (retention ratio) of 91%.

EXAMPLE 23

Example 12 was repeated except that the amount of ethylene-methyl methacrylate was reduced to 100 g. The mixed resin obtained was injection molded under conditions of 250° C. and 650 kg/cm². The molded article had tensile strength of 620 kg/cm², Izod impact strength of 38.5 kg·cm/cm and heat distortion temperature of 138° C. The chemical resistance of this product in terms of critical strain to turbine oil was 1.05%, to isopropanol 0.98% and to n-heptane 0.86%.

What is claimed is:

1. A method for the manufacture of a graft copolymer composition which comprises polymerizing under continued agitation a styrene in the presence of 20 to 85 percent by weight based on the final composition of a polyphenylene ether represented by the general formula:

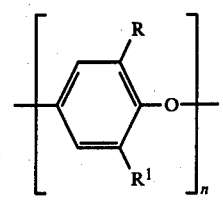

wherein R and R¹ each denote a hydrogen atom or an alkyl group having one to four carbon atoms and n the degree of polymerization, 3 to 40 percent by weight of an ethylene copolymer comprising ethylene and 1.0 to 40 mol percent of at least one unsaturated compound represented by the general formula of $CH_2=CHOCOR_1$ or $CH_2=CR_2COOR_3$ wherein, $R_1$ denotes an alkyl group having one to four carbon atoms and $R_2$ and $R_3$ each denote a hydrogen atom or an alkyl group having one to four carbon atoms and a radical polymerization initiator, at a temperature in the range of from 120° to 290° C.

2. A method as in claim 1 wherein the polyphenylene ether is poly(2,6-dimethylphenylene-1,4-ether) and the temperature for polymerizing the styrene is from 180° to 250° C.

3. A method as in claim 2 wherein the styrene is styrene alone or a mixture of styrene with acrylonitrile.

4. A method as in claim 3 wherein the ethylene copolymer is an ethylene-methyl methacrylate copolymer or ethylene-vinyl acetate copolymer.

5. A method as in claim 4 wherein 4 to 200 parts by weight of the ethylene copolymer, 10 to 200 parts by weight of the styrene and 0.3 to 15 parts by weight of a radical initiator are used per 100 parts by weight of the polyphenylene ether.

6. A method as in claim 5 wherein the styrene is in the range from 15 to 180 parts by weight.

7. A method as in claim 6 wherein the radical initiator is in the range from 0.5 to 12 parts by weight.

8. A method as in claim 1 wherein the styrene is styrene alone or a mixture of styrene with acrylonitrile.

9. A method as in claim 1 wherein the ethylene copolymer is an ethylene-methyl methacrylate copolymer or ethylene-vinyl acetate copolymer.

10. A method as in claim 1 wherein 4 to 200 parts by weight of the ethylene copolymer, 10 to 200 parts by weight of the styrene and 0.3 to 15 parts by weight of a radical initiator are used per 100 parts by weight of the polyphenylene ether.

11. A method as in claim 10 wherein the styrene is in the range from 15 to 180 parts by weight.

12. A method as in claim 10 wherein the radical initiator is in the range from 0.5 to 12 parts by weight.

13. A method as in claim 1 wherein polymerization is carried out in the presence of 1 to 10 percent by weight of a rubbery substance.

14. A method as in claim 13 wherein a styrene type compound polymer and/or a high impact styrene copolymer is further added.

15. A method as in claim 1 wherein a styrene type compound polymer and/or a high impact styrene copolymer is further added.

16. A method as in claim 13 wherein the polyphenylene ether is poly(2,6-dimethylphenylene-1,4-ether) and the temperature for polymerizing the styrene is from 150° to 230° C.

17. A method as in claim 16 wherein the styrene is styrene alone or a mixture of styrene with acrylonitrile.

18. A method as in claim 17 wherein the ethylene copolymer is an ethylene-methyl methacrylate copolymer or an ethylene-vinyl acetate copolymer.

19. A method as in claim 18 wherein the rubbery substance is selected from the group consisting of polybutadiene, styrene-butadiene random copolymer, styrenebutadiene block copolymer and ethylene-propylene-non-conjugated diene copolymer rubber.

20. A method as in claim 14 wherein the styrene polymer and/or the high impact styrene copolymer is at least one selected from the group consisting of polystyrene, rubber reinforced polystyrene, styrene-acrylonitrile copolymer, styrene-acrylonitrile-butadiene copolymer.

21. A method as in claim 20 wherein 5 to 120 parts by weight of the ethylene copolymer, 2 to 30 parts by weight of the rubbery substance, 10 to 50 parts by weight of the styrene polymer and/or high impact styrene copolymer, 0.3 to 15 parts by weight of the radical polymerization initiator and 10 to 200 parts by weight of the styrene are used per 100 parts by weight of the polyphenylene ether.

22. A method as in claim 21 wherein the styrene is in the range from 15 to 180 parts by weight.

23. A method as in claim 22 wherein the radical initiator is in the range from 0.5 to 12 parts by weight.

24. A method as in claim 13 wherein the styrene is styrene alone or a mixture of styrene with acrylonitrile.

25. A method as in claim 13 wherein the ethylene copolymer is an ethylene-methyl methacrylate copolymer or an ethylene-vinyl acetate copolymer.

26. A method as in claim 13 wherein the rubbery substance is selected from the group consisting of polybutadiene, styrene-butadiene random copolymer, styrenebutadiene block copolymer and ethylene-propylene-non-conjugated diene copolymer rubber.

27. A method as in claim 15 wherein the styrene polymer and/or the high impact styrene copolymer is at least one selected from the group consisting of polystyrene, rubber reinforced polystyrene, styrene-acrylonitrile copolymer, styrene-acrylonitrile-butadiene copolymer.

28. A method as in claim 13 wherein 4 to 120 parts by weight of the ethylene copolymer, 2 to 30 parts by weight of the rubbery substance, 10 to 50 parts by weight of the styrene polymer and/or the high impact styrene copolymer, 0.3 to 15 parts by weight of the radical polymerization initiator and 10 to 200 parts by weight of the styrene are used per 100 parts by weight of the polyphenylene ether.

29. A method as in claim 28 wherein the styrene is in the range from 15 to 180 parts by weight.

30. A method as in claim 28 wherein the radical initiator is in the range from 0.5 to 12 parts by weight.

31. A method as in claim 13, wherein polymerization is carried out by extrusion of a mixture of the polyphenylene ether, the radical initiator, the styrene, ethylene copolymer and the rubbery substance.

32. A method as in claim 14, wherein polymerization is carried out by extrusion of a mixture of the polyphenylene ether, the radical initiator, the styrene, ethylene copolymer, the rubbery substance, and the styrene polymer and/or the high impact styrene copolymer.

33. A method as in claim 1, wherein polymerization is carried out by extrusion of a mixture of the polyphenylene ether, the radical initiator, the styrene and the ethylene copolymer.

* * * * *